A. REUBOLD.
PROCESS FOR COOKING HAMS.
APPLICATION FILED MAY 10, 1916.
1,190,010.
Patented July 4, 1916.
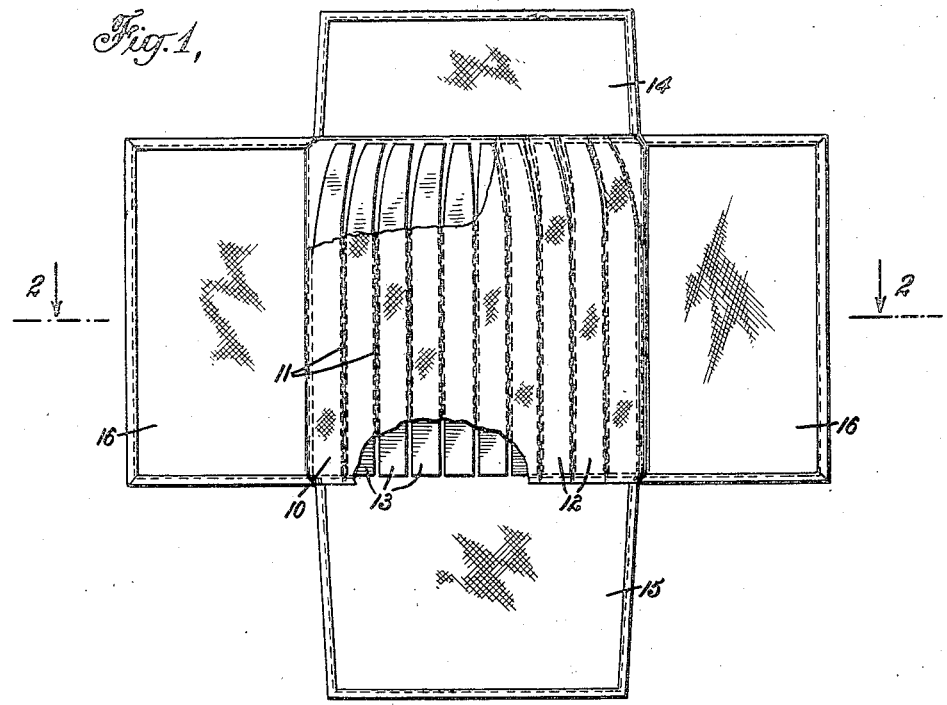
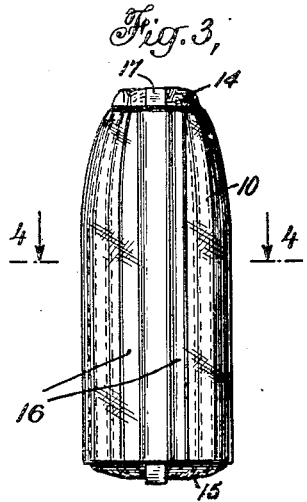
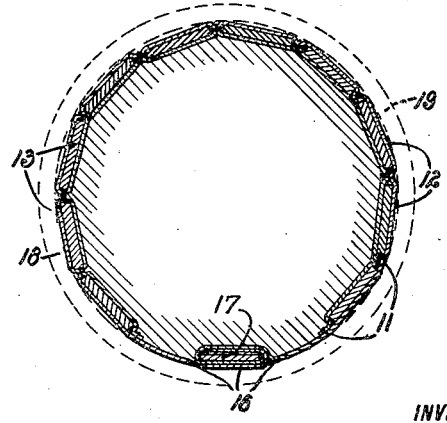
WITNESSES
INVENTOR
A. Reubold
BY
ATTORNEYS

UNITED STATES PATENT OFFICE.

ADAM REUBOLD, OF NEW YORK, N. Y.

PROCESS FOR COOKING HAMS.

1,190,010.  Specification of Letters Patent. Patented July 4, 1916.

Application filed May 10, 1916. Serial No. 96,565.

*To all whom it may concern:*

Be it known that I, ADAM REUBOLD, a citizen of the United States, and a resident of the city of New York, borough of the Bronx, in the county of Bronx and State of New York, have invented a new and Improved Process for Cooking Hams, of which the following is a full, clear, and exact description.

This invention relates to the preparation of food products, and has particular reference to means and methods of cooking meats, particularly boned hams.

Among the objects of the invention is to provide a device employed in the process of cooking hams, particularly in the meat cooker constituting the subject matter of my application for patent, Serial No. 32,409, allowed March 13, 1916. More definitely stated, the subject matter of this application relates to a jacket or wrapper of peculiar construction and utility, in which the meat to be cooked is tightly wrapped and when so wrapped is introduced into the cooker above referred to.

Another object of the invention is to provide a means for cooking hams or other meats with a view of improving the flavor thereof and retaining the juices within the meat.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of the wrapper or jacket; Fig. 2 is a sectional view on the line 2—2 of Fig. 1; Fig. 3 is an elevation showing the jacket wrapped around the ham preparatory to its introduction into the airtight cooker; and Fig. 4 is a transverse section on the line 4—4 of Fig. 3.

Referring now more particularly to the drawings as a basis for the process developed by me and set forth with particularity herein, I show a jacket made up mainly of a strong quality of tough heavy fabric, such as coarse linen, the main body portion of which is double, as shown at 10, and of rectangular form. This body is stitched with longitudinal rows of stitches at 11 to form a plurality of pockets 12, into which a series of stays 13 of any suitable nature are adapted to be introduced. The stays I have used with success comprise strips of wood, but obviously other materials may be employed if desired. These strips are of the same length and extend throughout the full length of the body 10. At the upper end of the body 10 is provided a flap 14, and at the lower end is a flap 15. Likewise there is provided on each side a flap 16. All of these flaps may constitute extensions of one portion of the body 10, and each flap is preferably bound or hemmed to strengthen or reinforce it.

The jacket described as above is maintained in a perfectly clean sanitary condition, but before applying it to a ham or the like, it is smoked by any suitable smoking process similar to the smoking of meats for the purpose of imparting to the meat cooked therein an improved flavor coincidentally with the cooking operation. After the ham is boned and otherwise ready to be treated, it is wrapped firmly within the jacket, as indicated in Figs. 3 and 4. During this operation, a stick or roller 17 is connected to the extreme free edges of the side flaps 16 and thereby the side flaps are rolled tightly together, causing the body of the jacket to grip snugly around the meat, indicated at 18. This stick is slightly, if any, longer than the body of the jacket and after the rolling is accomplished and the top and bottom flaps 14 and 15 are folded over the upper and lower ends of the ham, the whole is then introduced into the cooker indicated in dotted lines at 19, but fully described in the aforesaid specification. It is then compressed and hermetically sealed and left to rest for from ten to twelve hours before boiling or cooking. This, among other things, provides for the imparting of the improved flavor to the meat through contact with the smoked jacket. The cooker with the ham sealed therein as above set forth and left to rest for the required length of time, is then subjected to steam heat or its equivalent for the required length of time. The jacket or wrapper which incloses the meat protects the meat from the excessive heat, and thereby the juices of the meat are retained therein to a much greater extent than when the meat is cooked at a higher temperature or in more intimate contact with the heated vessel. The wooden stays employed in the body of the jacket, serve especially in keeping the temperature low and preventing the exudation of the juices and the formation therefrom of jelly. It follows, therefore, that not only is the meat preserved with the best possible flavor, but the least amount of waste or reduction in weight of the meat is occasioned.

As indicated in the drawings, the stays 13 are all preferably tapered at one end whereby the jacket is adapted to assume a somewhat conical form where it fits into the smaller end of the cooking utensil.

I claim:

1. The herein described process of cooking hams, the same including the use of a fabric jacket thoroughly smoked, the wrapping tightly of the jacket around the meat and thoroughly inclosing the meat, introducing the meat thus wrapped into an air-tight cooking receptacle, and afterward cooking the same in the receptacle, the jacket serving to maintain a comparatively low temperature for the meat.

2. The herein described process of cooking hams comprising the following steps: first, the wrapping of the ham snugly and completely in a smoked fabric jacket; secondly, introducing the wrapped ham into an air-tight cooking receptacle under pressure; thirdly, allowing the ham to rest in the receptacle for a number of hours; and finally, cooking the ham thus wrapped and sealed at low temperature.

ADAM REUBOLD.